Dec. 5, 1944.  A. L. JACKSON  2,364,533
ELECTRIC MEAT TENDERIZER
Filed Feb. 10, 1941  3 Sheets-Sheet 1
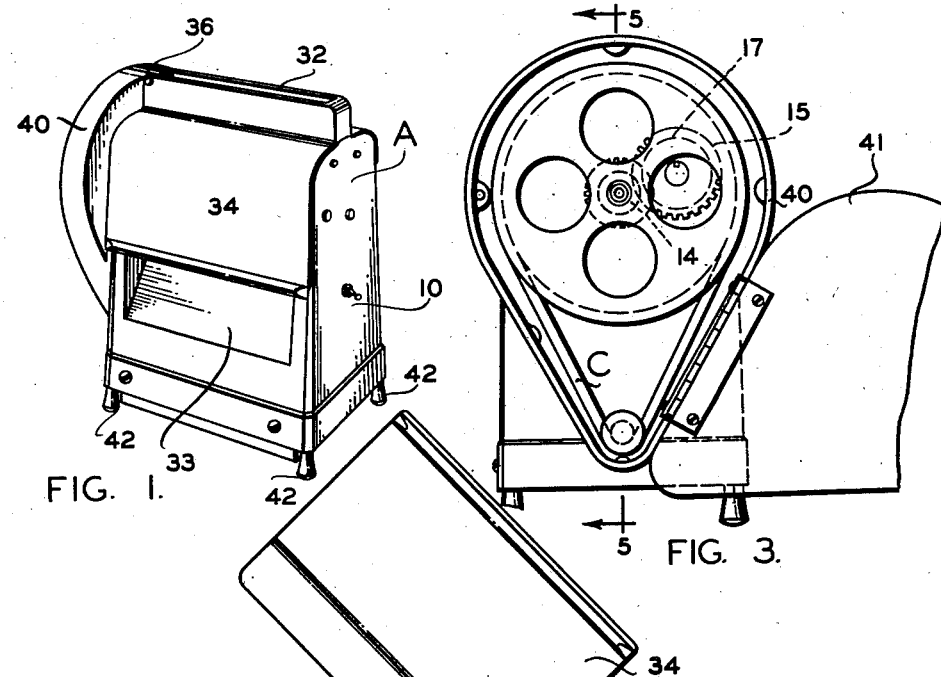
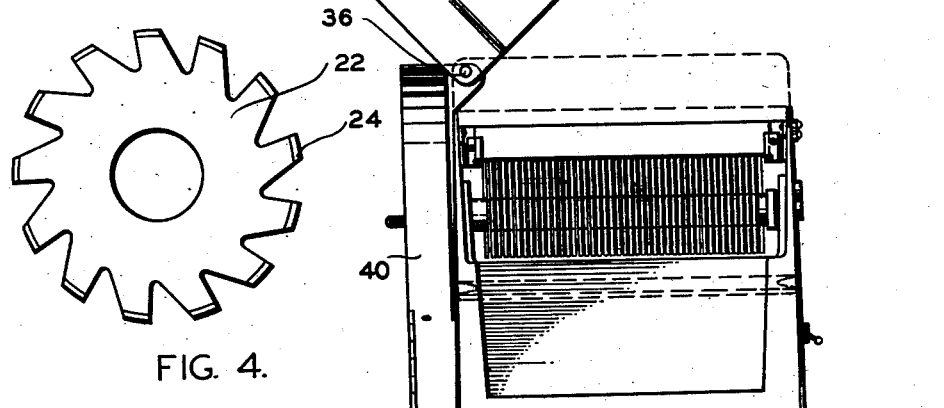
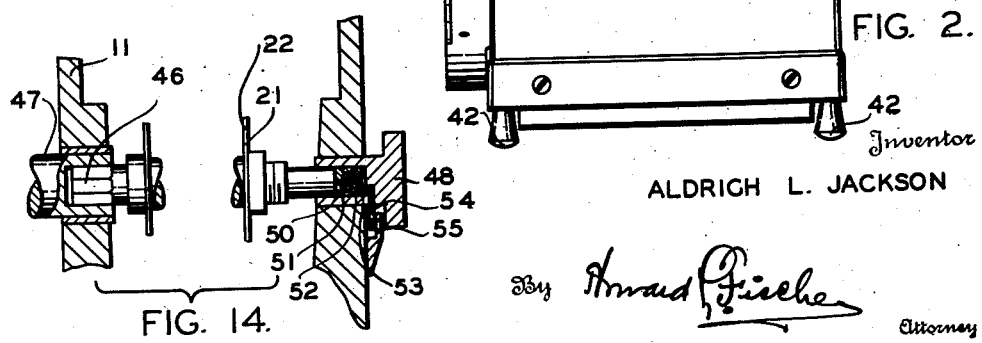
Inventor
ALDRICH L. JACKSON
By Howard Fischer
Attorney

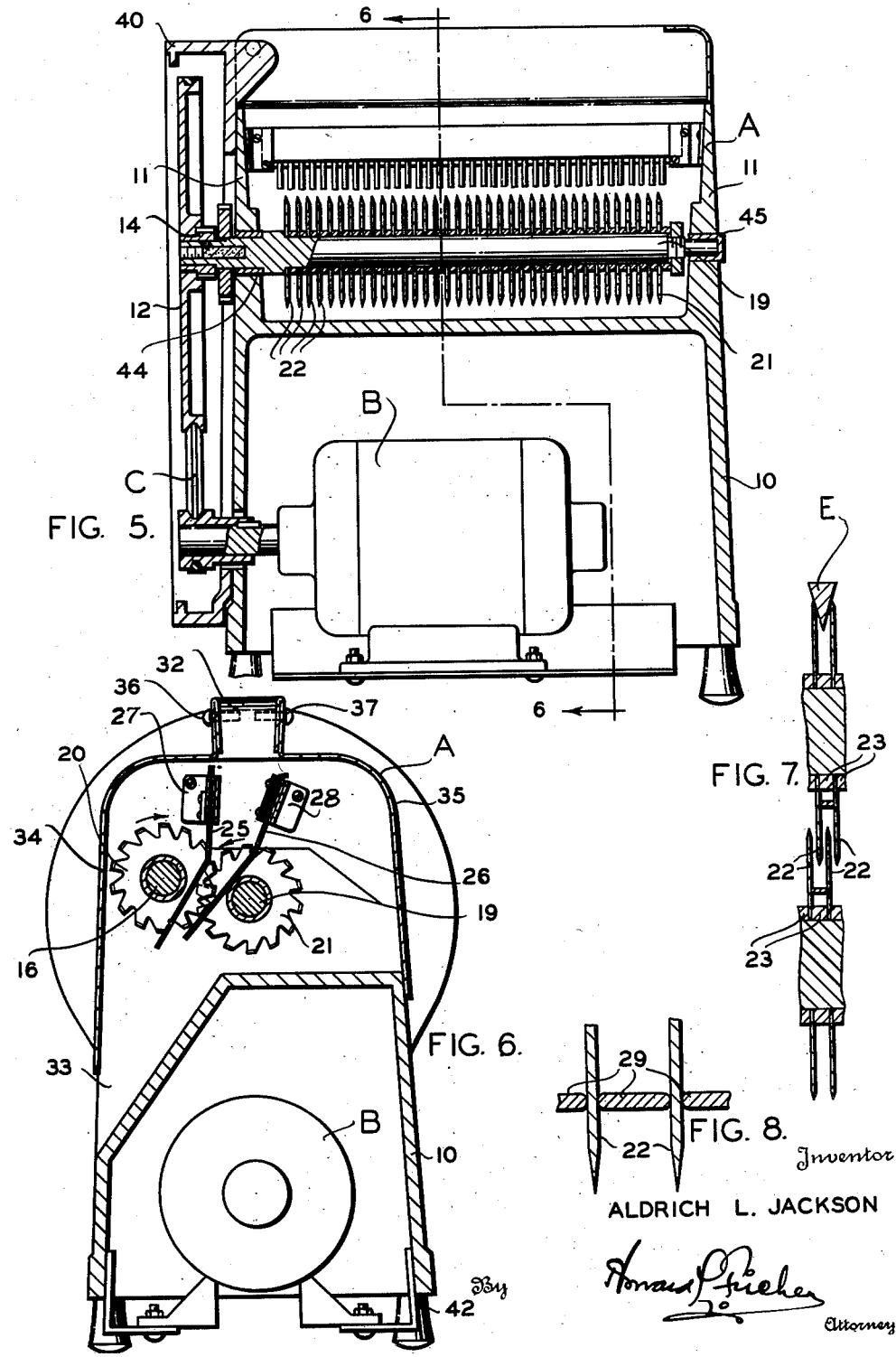

Dec. 5, 1944. A. L. JACKSON 2,364,533
ELECTRIC MEAT TENDERIZER
Filed Feb. 10, 1941 3 Sheets-Sheet 3

Inventor
ALDRICH L. JACKSON
By Armand L. Fieche
Attorney

Patented Dec. 5, 1944

2,364,533

UNITED STATES PATENT OFFICE 2,364,533

ELECTRIC MEAT TENDERIZER

Aldrich L. Jackson, Minneapolis, Minn.

Application February 10, 1941, Serial No. 378,185

18 Claims. (Cl. 17—26)

My invention relates to an electric meat tenderizer, having a pair of processing members associated together which are made up of a series of toothed disc-like blades spaced apart to provide a cutting action and having associated therewith a pair of resilient meat compressing strippers.

The processing rollers or members have a series of parallelly disposed disc blades which are shaped with teeth; and on the ends of the teeth, arcuated sharp knife blades are formed. The knife blades cut slits in the meat as the meat passes between the rollers so that virtually the entire area of the meat is cut with slits by these tooth blades so that the fibers of the meat are slit as it is passed between the processing rollers. The knife ends on the teeth have a draw-cut action on the meat fibers.

A feature resides in providing cutting members made up of a series of spaced apart toothed cutting blades which may be sharpened while the blades are rotating by holding a sharpening instrument between the peripheral edges of the blades, so that the teeth of two adjacent cutting discs may be sharpened at one time. Further, the teeth on these blades are shaped to slant backward away from the direction of rotation of the blade to facilitate stripping and so that the blades act as cutters on the meat with a draw-like cut, while the intermittent teeth of the blades act to draw the steak or cut of meat through the machine. The cutter discs are formed of thin sheet steel or other suitable material and are spaced apart but comparatively close to each other.

It is also a feature to provide the removable resilient stripper means which act to compress the meat being tenderized as it passes through the machine, these stripper elements being removable as units, and the tines of the strippers fitting against the adjacent sides of the disc toothed cutting blades so as to keep the cutting discs clean. Thus when the steak comes out of the machine, it is not only tenderized, but is compressed together into shape ready to be prepared for eating.

A further feature resides in providing a meat tenderizer wherein the knife-like teeth blades may be easily kept sharp, which is essential to avoid crushing or tearing of the meat. When the blades are sharp, a clean piercing cut will be made in the meat passing between the blades, owing to the design of the teeth of the blades wherein a circular arcuated cutting edge is maintained on the teeth of the respective blades. The teeth may be kept sharp as hereinbefore pointed out.

I provide a hinged cover and guard over the blades which gives easy access to the blades so that they may be readily cleaned and sharpened and at the same time protect the operator from the action of the blades when the machine is in operation, a slot being provided at the top of the machine into which the meat is inserted.

It is also a feature to provide easily removable free-ended blade cleaning and stripping combs, the tines of which virtually contact the sides of the blades, while the free ends thereof have a resilient action designed to press or flatten the meat as it emerges from the blade cutters and out of the machine. My method of tenderizing the meat accomplishes this in a very desirable manner regardless of the roughness or odd shape of the meat which is fed into the machine. The type of meat tenderized by my machine cannot always be cut in uniform slices.

A further feature of my machine resides in providing tined stripper combs, the free ends of which are spaced, extending toward each other closely enough so as to press the meat from both sides, thereby imprinting the steak with a neat, attractive, and desirable surface design as it leaves my machine.

The free ends of the tines of the comb stripper assembly are pointed, acting to guide the tines between the blades when either of the stripper assemblies is inserted into operative position. It is also a feature to provide the cutter blades with rearwardly slanting tooth-like portions, which allow the stripper means to clean the same readily and make the teeth of the blades self-cleaning by passing between the tines of the stripper comb, so that any particles of meat which might otherwise adhere to the teeth will be stripped off the backwardly slanting teeth as they rotate between the stripping tines. Therefore the design and shape of the teeth of the blades are important in the operation of my machine.

It is also a feature to provide processing rollers made up of a series of toothed blades, the teeth of which incline backwardly in a direction opposite to the working rotation of the processing intermeshing bladed rollers. A chute is provided leading to the rollers so that meat may be dropped into the chute and passed between the rollers, the meat being cut into a loose tender texture. The method and operation is carried out by utilizing gravity to carry the meat into and out of the machine. Thus it is not necessary to provide a pallet or carrier for the meat when it is processed in my machine.

Other features and details will be more fully and clearly set forth in the following specification and claims.

In the drawings forming a part of my specification:

Figure 1 is a perspective view of my meat processing machine for tenderizing meat.

Figure 2 is a front view of the same showing the front guard or cover raised to expose the processing rollers.

Figure 3 is an end view of my machine showing the cover opened to disclose the driving belt and gearing which operate the processing rollers.

Figure 4 illustrates one of the toothed blades, showing the backwardly inclined self-stripping design of teeth.

Figure 5 is an enlarged section on the line 5—5 of Figure 3, taken in the direction of the arrows.

Figure 6 is a section taken on the line 6—6 of Figure 5.

Figure 7 is a diagrammatic sectional detail showing in enlarged form the relative intermeshing position of the toothed blades of the processing rollers and showing the manner in which the same can be sharpened when desired.

Figure 8 is an enlarged detail section of a portion of two of the blades of the processing wheels and showing the relative position of the tines, in relation to the blades, of the stripper comb assembly.

Figure 14 illustrates diagrammatically the manner in which the processing rollers may be removably held between the standards of the machine A.

My electric meat tenderizer A is made with a casing portion 10 having end standard portions 11 which project upwardly from the ends of the base of the casing and which are adapted to support the operating or processing rollers which tenderize the meat or steak when fed into the machine.

Figure 12:
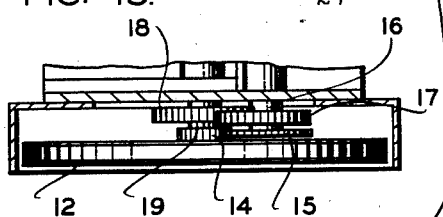
Figure 12 is a sectional detail showing the plan of a portion of the gear assembly and driving belt which operate the processing rollers.

The casing 10 houses an electric motor B in its base which is adapted to operate the drive belt C which rotates the main drive pulley 12. The drive pulley 12 operates the pinion 14 which is free to rotate on the shaft 19. The pinion 14 intermeshes with the gear 15 which in turn rotates the shaft 16 which carries the gear 17, and the gear 17 meshes with the gear 18 to rotate the shaft 19. The shafts 16 and 19 carry the processing rollers 20 and 21. The gears 14, 15, 17, and 18 are shown in Figures 3 and 12. The gears 17 and 18 operate the processing rollers 20 and 21 in unison.

Figure 11:
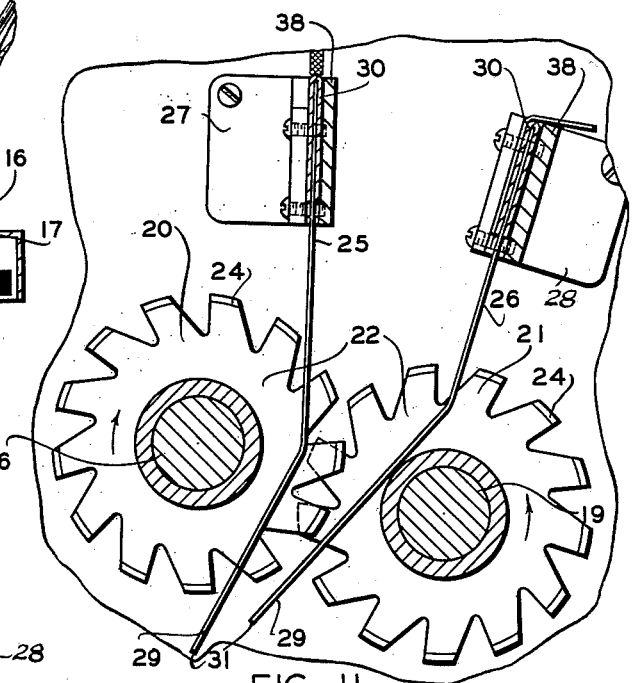
Figure 11 is an enlarged sectional detail of the processing rollers and the removable comb stripper assemblies which form a portion of the chute which guides the meat to the processing rollers and which shape or form the meat or steak as it passes from the processing rollers.

The processing rollers 20 and 21, which are carried on the shafts 16 and 19, respectively, are adapted to rotate in the direction of the arrows indicated in the drawings as shown in Figures 6 and 11. These processing rollers are made up of a series of toothed cutting blades 22. The blades 22 are spaced apart on the shafts 16 and 19 by means of the spacer collars 23, it being desirable that the blades 22 be comparatively close together; and when the shafts 16 and 19 are in operative position, the teeth of the blades 22 overlap as illustrated in Figures 6, 7, and 11. The teeth on the blades 22 are backwardly inclined from the direction of rotation of the blades and the outer peripheral edge is sharpened with a bevelled cutting edge 24. The cutting edge 24 of each of the teeth of the blades 22 is of an arcuated nature; and by reason of the backwardly inclined teeth of the blades, the cutting edges 24 on the ends of the teeth act as knives to slice into the body of meat which is fed into the processing rollers 20 and 21.

I provide a spring finger stripper assembly 25 for the roller 20 and a similar spring finger stripper assembly 26 for the roller 21. These spring finger stripper assemblies are removably held in the end brackets 27 and 28, respectively.

Figure 9:
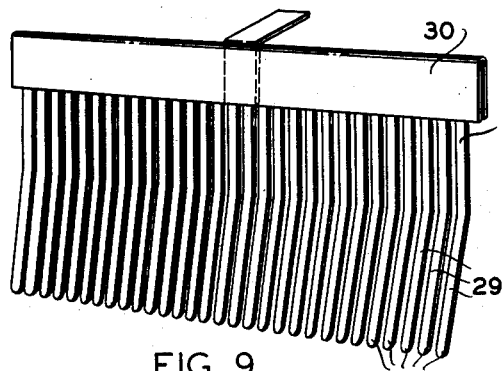
Figure 9 is a perspective view of one of the stripper comb assemblies showing the same removed from the machine.
Figure 13:
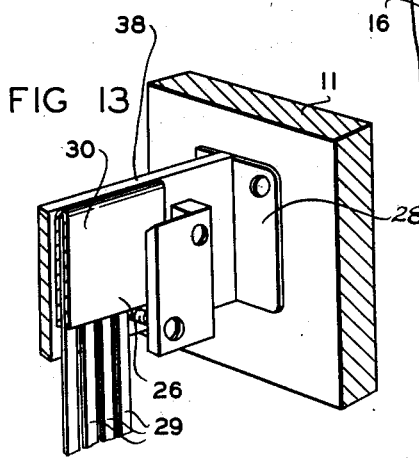
Figure 13 is a perspective detail of the bracket for supporting the stripper assembly between the side walls of the machine.

In Figure 9 I have illustrated the spring finger stripper assembly 26. The stripper assembly 25 is virtually the same as the stripper assembly 26 in that each of these stripper assemblies is formed with a series of spring fingers 29 which are held together by the top bar 30 with the free ends of the fingers 29 extending parallel, and the outer ends 31 of the fingers are pointed so that the stripper assembly may be inserted into operating position with the free ends of the fingers 29 extending between the blades 22 of the respective rollers 20 and 21. The fingers 29 engage the inner surfaces of the blades 22 as illustrated in the enlarged detail in Figure 8, so that the spring stripper fingers act to keep the blades 22 clean in the operation of the machine A. The finger supporting bar 30 of each of the spring stripper assemblies 25 and 26 slidably engages in the end brackets 27 and 28 as illustrated in the perspective detail shown in Figure 13.

The spring stripper assemblies 25 and 26 are positioned in a manner so as to provide a chute-like passageway leading from the meat receiving slot 32 formed in the top of the casing of the machine A, so that when a piece of meat or an irregular shaped piece of meat is fed into the slot 32 in the machine A, it will drop into the chute-like passage or guide-way formed by the stripper assemblies 25 and 26 illustrated in Figures 6 and 11 to guide the steak to the processing rollers 20 and 21. The fingers 29 are bent or shaped so as to decrease the width of the passageway between the respective sets of fingers of the respective assembles 25 and 26 at the lower free end of the fingers so that the meat fed into the processing rollers will have to pass between these fingers as it is processed. Further, the fingers 29 act to press or bear against the meat after it has been processed, so as to compress the meat so that when the meat has been processed it is tenderized and it is discharged out of the machine A through the slanted chute opening 33 in the machine A in a finished form, as illustrated in Figure 15.

Figure 15:
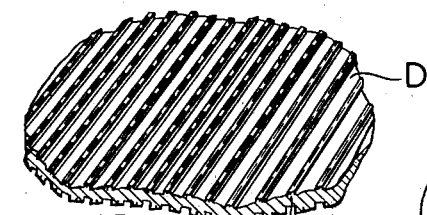
Figure 15 illustrates a steak which has been processed through my machine once.

In Figure 15 I have illustrated a piece of meat D processed by my machine and shown with the design in the surface thereof when the piece of meat has been put through my machine one time only. Figure 15 illustrates a series of slits 24' in the face of the meat D which are formed by the cutting edges 24 on the ends of the teeth of the tenderizing blades 22. It is obvious, however, that the piece of meat D may be reinserted into the machine A and processed as many times as desired, and also that the piece of meat D may first be put through the machine in one direction to process it with a design such as is illustrated in Figure 15 in the surface thereof, and then this steak-like piece of meat can be put through in a direction so that the design will be at right angles or at any angle to the design first formed in the steak. In this manner I am able to finish the steaks with different designs and with as much of a tenderizing action in the slitting of the fibers of the meat as may be desired. The piece of meat D may be put through as many times as desired in tenderizing the same.

While the processing of the meat which cuts and tenderizes the meat as it passes through the processing rollers 20 and 21 is of primary importance, it is also important that the meat be delivered in a uniformly pressed or molded form or shape so as to make a neat appearance to the meat rather than having the meat ragged and rough in appearance as it is discharged from the machine A.

The disced blades or knives 22 may be sharpened by a three-cornered file E or other sharpening element such as E which is of the desired shape so as to form the bevelled cutting edges 24 on the ends of the teeth of the blades 22. It is important that these teeth be kept sharp at all times, and with my machine, where the rollers 20 and 21 are rotated under the power of the motor B, it is only necessary that the sharpening tool E be brought into contact with the peripheral edges of the teeth of the blades 22 while the machine is operating, and in this manner the teeth may be kept very sharp at all times. This operation is quick and convenient which is also a desirable advantage in my machine.

I provide hinged cover guard plates 34 and 35 which are pivoted at 36 and 37 respectively, so that the covers 34 and 35 may be raised as illustrated in Figure 2 when it is desired to clean the machine or to have access to the processing rollers. These hinged cover guard plates are shaped to the outside shape of the standards 11 so as to provide a streamlined finished form or outside shape to the machine A to give the same a neat finished appearance and to entirely enclose the working parts, so as to protect the operator against coming in contact with the sharp toothed blades 22 while the machine is in operation.

I also provide bars 38 which extend across between the brackets 27 and 28 above the processing rollers 20 and 21 which also act as guards from the top so that, even if the covers 34 and 35 are elevated, the operator of the machine cannot readily come in contact with the blades 22 by reason of these guard plates 38.

The belt C is covered by the housing 40 positioned on the side of the machine so as to enclose the belt and the operating gears which are operated by the pulley 12. This housing is provided with a hinged door 41 which is shown in open position in Figure 3. When the door 41 is closed, the belt and operating gears are entirely enclosed. Thus the housing 40 forms a streamlined finished casing for the operating members of the machine. It is desirable that the outer appearance of a machine of this character should be smooth, streamlined, and of a material so that it can be readily cleaned. Therefore, I provide my machine A with metal parts which are enamelled such as the casing 10, the standards 11, and the housing 40. I also provide rubber rest portions 42 on which the machine A is supported so as to cushion the machine and hold it in place while being operated.

The cutting blades 22 are overlapped as illustrated and described heretofore which is shown also diagrammatically in Figure 7, and it will be apparent that these blades are spaced closely together so that the entire surface of a steak passed between these blades is slit by the sharp edges 24 of the blades so as to thoroughly tenderize the finished steak. When meat is processed in my machine A by passing it between the processing rollers 20 and 21, the sharp blades formed by the teeth of the blades cut the fibers and sinews without mashing the much-desired juice pockets of the meat as it tenderizes the same. Each tooth of the blades 22 acts as a small knife which forms a little slit 24' in the meat with a more or less draw-cut action by reason of the backwardly inclined teeth of the blades and by the arcuated sharp bevelled cutting edges 24 on the periphery of the same. Thus, as the rollers 20 and 21 carry the steak between the teeth of the same, the fibers of the meat are thoroughly and completely slit, thereby opening the inner portions of the steak to tenderize the same and permit the heat to penetrate the steak when it is heated to finish the same for eating.

Figure 10:
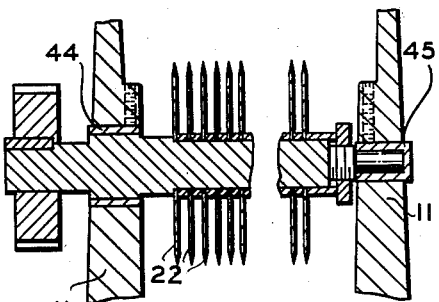
Figure 10 is a sectional detail showing one method of mounting the processing rollers.

While the shafts 16 and 19 of the rollers 20 and 21 may be held in the standards or sides 11 of the machine A in a manner to ordinarily prevent their removal by reason of being supported in their respective bearings 44 and 45, which bearings are fixed in the standards 11 as illustrated in Figures 5 and 10, it may be desirable to support the processing rollers readily removable as illustrated in Figure 14. When the processing rollers are supported in a removable manner, one end 46 of the shaft supporting the cutting discs 22 may be made hexagonal to removably fit into a hexagonal socket in the shaft 47.

The roller or shaft 21 extending into the knob 48 is rounded, and is adapted to engage against the washer 50 which is provided with a hole 51 through which a wick 52 extends to lubricate the end of the shaft 21. The wick extends from an oil well portion 53 formed in the knob 48. A pin 54 is provided in the knob 48 which engages against the fixed shoulder 55 to positively lock the end of the roller or shaft 21 in operative position. By rotating the knob 48, the pin 54 becomes free from the shoulder 55 and the knob 48 may be drawn from the end of the roller or shaft 21. Thus the rollers 20 and 21 may be removed from the machine.

The method includes the tenderizing a piece of meat consisting in moving the meat vertically in a downwardly direction and deflecting the meat laterally while simultaneously piercing the meat on both sides thereof by the discs 22 and simultaneously compressing the meat between the spring fingers 29 and while moving the meat in an inclined direction to its first direction of movement, causing the meat to then move substantially vertically downwardly and simultaneously causing a bending of the meat to open the pores on one side thereof and then causing the meat to be deflected in an inclined direction downwardly and bending the meat to open the pores on the other side thereof.

I claim:

1. A machine for tenderizing meat into steaks comprising a pair of processing rollers, each roller including a series of parallelly disposed spaced thin cutter discs, teeth formed in said discs, arcuated knife edges formed on the periphery of said teeth, means for rotating said processing rollers in unison and in a direction of rotation toward each other, and a chute formed by a pair of spring finger combs, the fingers of which extend between and beyond said discs to direct the meat between said processing rollers.

2. The method of tenderizing meat into steaks consisting in passing the meat between processing rollers which have knife-like teeth adapted to form draw-cut slits in close parallel proximity to each other to cut the fibers and form open slits throughout the area of the steak, and pressing both sides of the slitted meat together as it is processed.

3. The method of processing meat or steaks consisting in passing various shaped pieces of meat between a pair of processing rollers which by a draw action simultaneously cut slits in the area of both sides of the meat as the meat is drawn through the processing rollers by the rotation of the rollers, and simultaneously pressing each side of the meat to hold the meat compressed under spring tension as it is cut on each side.

4. An electrically operated meat tenderizing machine comprising a casing, an electric motor in the base of said casing, a belt drive from said motor to a driving pulley in the upper portion of said casing, a pair of processing rollers, gear means connecting said pulley with said processing rollers, each of said processing rollers including a series of disc-toothed knives, each tooth of which is formed with an arcuated sharp cutting blade, an opening in the top of said casing into which meat to be processed is dropped by gravity, chute means for guiding the meat to and between said processing rollers, and spring finger means formed in said chute for stripping the knives of said processing rollers and to simultaneously press the sides of the meat which has been processed between said rollers to shape the meat into a steak as it is processed and carried through said machine by said processing rollers.

5. A machine for tenderizing and forming meat into steaks, including a chute-like opening for receiving the meat which is dropped into said opening, processing roller means in said machine, a casing for enclosing said roller means, an electric motor within said casing for driving said rollers, said rollers including a series of spaced apart cutting blades, the blades of each roller overlapping with those of the adjacent roller, spring finger stripper assemblies for each of said rollers adapted to form chute-like guide means to carry the steak to and from said rollers and being adapted to press the meat as it passes from said rollers to shape the same into steak form.

6. A meat tenderizing machine including a casing, an electric motor within said casing, a pair of processing rollers journalled in said casing in a manner to be rotated by said motor, means causing said rollers to rotate in a direction toward each other, said rollers including a series of spaced apart, toothed, thin, razor blade-like cutter discs, the peripheral edges of the teeth on said discs being adapted to be sharpened with a beveled cutting edge by placing a triangular-like sharpening instrument between the adjacent cutter discs while the discs are rotated, forming arcuated cutting edges on said teeth, said teeth having a backward inclined formation in relation to the direction of rotation of said teeth of said discs, the teeth of said discs overlapping and being spaced comparatively close together, whereby, when meat is dropped into position to be engaged by said processing rollers, the meat is drawn between said rollers and is processed by the cutting of small slits between toothed knives of said discs throughout the area of the meat to tenderize the same.

7. A cutter for a meat tenderizing machine including a thin disc-like body portion, a series of tooth-like blades formed marginally about the periphery of said body portion, said cutter being adapted to be rotated in the operation of the same to tenderize meat, each of said teeth having a backwardly inclined formation to the working direction of rotation of said cutter, and a razor-like arcuated cutting edge formed on the ends of said teeth.

8. A meat tenderizing machine including removable processing rollers, each of said rollers including a series of thin disc-like toothed steel knives, the arcuated peripheral edges of the teeth of said knives being sharpened to a razor-like cutting edge by rotation of said rollers, bearing means for supporting said rollers with the teeth of said knives overlapping, electrical means for rotating said rollers toward each other in unison, a casing for enclosing and supporting said rollers, a meat receiving slot formed in said casing, a discharging chute formed extending out of said casing, pivotally supported guard plates for either side of said casing to give free access to either side of said rollers, and removable spring stripper comb assemblies for each of said rollers spaced apart to provide a meat receiving chute extending from said meat receiving slot in said casing and directing the meat between and from said rollers to discharge the tenderized meat out of said discharge chute by gravity.

9. A meat tenderizing machine including a pair of processing rollers, each comprising a series of disc-like closely spaced parallelly disposed toothed cutting blade knives, the teeth of the respective knives overlapping and being interspaced with each other, removable spring-tined stripper comb assemblies for each of said rollers, said stripper comb assemblies being positioned to form a chute into which meat is dropped by gravity to be engaged by the teeth of said knives, the peripheral edges of said knives being sharpened to provide tooth-like cutter blades for cutting slits into the meat being processed, the free ends of said spring stripper comb assemblies being spaced relatively close together to compress the meat as it is processed and discharged out of said processing rollers, means for removably supporting said processing rollers to permit the same to be readily changed for other similar rollers, electrical means for rotating said rollers in unison toward each other, a casing for enclosing said rollers, and pivotally supported guard plates on either side of said rollers to give free access to either side thereof by lifting said guard plates.

10. The method of tenderizing meat steaks and the like, consisting in dropping the meat by gravity between a pair of rotating processing rollers, the processing rollers acting to cut slits into each side of the steak and at the same time draw the meat between the rollers, cutting numerous slits in the area of the meat to tenderize the same by slitting the fibers thereof, and simultaneously pressing the sides of the slitted meat together into compact form and then dropping it by gravity after it is so processed.

11. A machine for tenderizing and processing meat including a pair of processing rollers, said rollers including a series of parallelly disposed spaced apart toothed cutter discs, removable spring stripper combs for each of said rollers, and means for supporting said combs spaced apart in a manner to provide a chute into which the meat is introduced, the free ends of each of said combs extending below the said rollers toward each other to narrow the passageway between the combs forming the chute, whereby when a piece of meat is processed and partially shaped by passing through said rollers, it is carried on between the free ends of said combs and is caused to be pressed by the free ends of said combs, to finally shape the meat into steaks as it leaves said tenderizing machine.

12. A machine for processing meat to tenderize the same including a casing, an electric motor within the base of said casing, a chute-like opening formed in the top of said casing, a removable unitary complemental chute means associated with said opening to carry meat by gravity into and out of said machine, and meat processing means within said casing and adapted to be operated by said electric motor, said processing means including means for draw-cutting small slits simultaneously into each side of the steak as it is processed.

13. A machine for tenderizing and processing meat including a pair of processing rollers having a series of spaced apart cutter discs thereon, removable spring stripper combs for each of said rollers, and means supporting said combs spaced apart in a manner to provide a chute into which the meat is introduced, the free ends of each of said combs extending toward each other below the said rollers to narrow the passageway between the combs, whereby when a piece of meat is processed and partially shaped by passing through said rollers it is carried on between the free ends of said combs for forming a series of slightly depressed areas throughout the area of the meat.

14. A machine for tenderizing and processing meat including a pair of processing rollers having a series of parallel spaced apart cutting discs thereon, removable spring stripper combs provided with a series of parallel spaced apart fingers for each of said rollers, and means for supporting said combs spaced apart in a manner to provide a chute into which the meat is introduced, the fingers of each of said combs extending below the said rollers, whereby when a piece of meat is processed and partially shaped by passing through said rollers it is carried on between the fingers of said combs.

15. A machine for tenderizing and processing meat including a pair of processing rollers having a series of parallel spaced apart cutting discs thereon, and a removable chute means for guiding the meat to and between said processing rollers, said chute means including a plurality of resilient free-ended fingers extending between each of said cutting discs with the lower portions thereof extending below said processing rollers and narrowing the passageway of said chute whereby when a piece of meat is processed by passing through said processing rollers it is guided out of said machine by said resilient chute means.

16. A machine for tenderizing and processing meat including a pair of processing rollers having a series of spaced apart cutter discs thereon, a removable spring stripper comb for each of said rollers, and means supporting said combs spaced apart in a manner to provide a chute into which the meat is introduced, the free ends of each of said combs extending below the said rollers and toward each other to narrow the passageway between the combs, the lower end of one of the said stripper combs extending below the said rollers a greater distance than the lower end of the other of said stripper combs, whereby when a piece of meat is processed and partially shaped by passing through said rollers, it is carried on between the free ends of said combs and is caused to be pressed by the free ends of said combs, to finally shape the meat into steaks as it leaves said tenderizing machine.

17. A machine for tenderizing and processing meat including a pair of processing rollers having a series of spaced apart toothed disc-like cutter knives thereon, chute means for guiding the meat to and between said processing rollers, said chute means including a substantially vertical series of resilient fingers each extending between adjacent ones of the said cutting knives on one of said rollers, with the free ends of said fingers extending below said rollers, and a second series of resilient fingers extending between each of the cutting knives of the remaining roller, the latter series of resilient fingers being rearwardly inclined with respect to said substantially vertical fingers with their free ends extending below said rollers and toward said substantially vertical fingers for narrowing the passageway of said chute means, whereby, when a piece of meat is processed and partially shaped by passing through said rollers, it is carried on between the free ends of said resilient fingers and is caused to be pressed to form a series of slightly depressed areas throughout the area of the meat.

18. The method of tenderizing a piece of meat consisting in moving the meat vertically in a downwardly direction, deflecting the meat laterally while simultaneously piercing the meat on both sides thereof in off-set relation, simultaneously compressing the meat while piercing the same and while moving the meat in an inclined direction to its first direction of movement, causing the meat to then move substantially vertically downwardly and simultaneously causing a bending of the meat to open the pores on one side thereof and then causing the meat to be deflected in an inclined direction downwardly and bending the meat to open the pores on the other side thereof.

ALDRICH L. JACKSON.